(12) United States Patent
Saeki et al.

(10) Patent No.: US 7,722,970 B2
(45) Date of Patent: May 25, 2010

(54) SYSTEMS AND METHODS FOR CHARGING A FUEL CELL VEHICLE

(75) Inventors: Hibiki Saeki, Utsunomiya (JP); Satoshi Aoyagi, Tochigi-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 1185 days.

(21) Appl. No.: 11/193,387

(22) Filed: Aug. 1, 2005

(65) Prior Publication Data
US 2006/0021812 A1    Feb. 2, 2006

(30) Foreign Application Priority Data

Aug. 2, 2004    (JP) ............................. 2004-225154
May 11, 2005    (JP) ............................. 2005-138294

(51) Int. Cl.
*H01M 8/00*    (2006.01)
*B60K 1/00*    (2006.01)

(52) U.S. Cl. .............................. 429/13; 429/22; 429/23; 180/65.31

(58) Field of Classification Search ................... 429/13, 429/22, 23, 21, 9; 180/65.3, 65.31; 320/101
See application file for complete search history.

(56) References Cited

U.S. PATENT DOCUMENTS

| 5,714,874 | A | * | 2/1998 | Bonnefoy | ................... 323/299 |
| 6,815,100 | B2 | | 11/2004 | Aoyagi et al. | |
| 2002/0038732 | A1 | | 4/2002 | Sugiura et al. | |

FOREIGN PATENT DOCUMENTS

| JP | 10-304511 | | 11/1998 |
| JP | 2001-357865 | A | 12/2001 |
| JP | 2002-118981 | A | 4/2002 |
| JP | 2003-208913 | | 7/2003 |
| JP | 2003-235162 | | 8/2003 |

* cited by examiner

*Primary Examiner*—Raymond Alejandro
(74) *Attorney, Agent, or Firm*—Arent Fox LLP

(57) ABSTRACT

Disclosed are systems and method for charging a fuel cell vehicle comprising a fuel cell, a rotating load, an energy storage, a contactor, a DC-DC converter, and a control unit. When charging of the energy storage is performed, the DC-DC converter connected to the energy storage is placed in a direct connection mode wherein the input voltage and the output voltage of the DC-DC converter are the same without voltage adjustment for directly charging regeneration electrical energy from a motor of the rotating load to the energy storage.

5 Claims, 11 Drawing Sheets

SYSTEMS AND METHODS FOR CHARGING A FUEL CELL VEHICLE

BACKGROUND OF THE INVENTION

1. Field of the Invention

The present invention relates to a fuel cell vehicle including a fuel cell capable of generating electrical energy by electrochemical reaction of a reactant gas and outputting the electrical energy to a rotating load, a rechargeable energy storage, a switching mechanism for electrically connecting the fuel cell to the rotating load and the energy storage or electrically disconnecting the fuel cell from the rotating load and the energy storage, and a DC-DC converter connected to the energy storage. Further, the present invention relates to a method of controlling the fuel cell vehicle.

2. Description of the Related Art

A fuel cell is a system that supplies a fuel gas (chiefly containing hydrogen) to an anode and supplies an oxygen-containing gas (chiefly containing oxygen) to a cathode to induce electrochemical reaction for generating DC electrical energy.

For example, a solid polymer fuel cell employs a polymer ion exchange membrane as an electrolyte membrane. The electrolyte membrane is interposed between an anode and a cathode to form a membrane electrode assembly. The membrane electrode assembly is sandwiched between separators to form a power generation cell. In use, generally, a predetermined number of power generation cells are stacked together to form a fuel cell stack.

The fuel cell can be mounted in a vehicle such as an automobile, and such a fuel cell vehicle is drawing great attention. Advantageously, the fuel cell vehicle can generate electrical energy efficiently without noxious emissions.

In the fuel cell vehicle, in order to assist the output responsiveness or the like of the fuel cell, a hybrid power supply system which additionally uses a energy storage such as a battery or a capacitor (electric double layer capacitor) is adopted. For example, Japanese Laid-Open Patent Publication No. 2002-118981 discloses a direct power supply including a fuel cell. As shown in FIG. 10, a fuel cell 1 and a battery 2 are connected in parallel to an inverter 3. The electrical energy supplied to the inverter 3 is converted to three-phase alternating current (AC) electrical energy, and supplied to a synchronous motor 4. Thus, wheels 5L, 5R connected to the synchronous motor 4 are rotated.

A DC-DC converter 6 is provided between the battery 2 and the inverter 3. The DC-DC converter 6 is a DC voltage converter, having a function of adjusting the DC voltage inputted from the battery 2, and outputting the adjusted voltage to the inverter 3, and a function of adjusting the DC voltage inputted from the fuel cell 1 or the synchronous motor 4, and outputting the adjusted voltage to the battery 2.

According to the disclosure, the maximum output ratio between the fuel cell 1 and the battery 2 is determined such that the output of the fuel cell 1 falls within the range of 65% to 80% of the overall output. Thus, the loss in the DC-DC converter 6 is minimized, and it is possible to achieve high energy efficiency.

In the conventional technique, during discharging of the battery 2 (during running), the input of the DC-DC converter 6 is set on the side of the battery 2, and the output of the DC-DC converter 6 is set on the side of the inverter 3. The output voltage VPIN matches the output voltage VFC of the fuel cell 1.

During charging of the battery 2 (during regeneration), since the output current IGC of the fuel cell decreases, as shown in FIG. 11, the output voltage VFC of the fuel cell 1 increases, and the input voltage VPIN of the DC-DC converter 6 on the side of the inverter 3 also increases. Thus, in the DC-DC converter 6, in order to maintain the certain voltage difference between the output voltage VBATT on the side of the battery 2 and the input voltage VPIN on the side of the inverter 3, during power regeneration, switching operation is carried out continuously.

Therefore, the switching loss occurs in the DC-DC converter 6, and part of the regeneration energy is lost. Consequently, the fuel economy is degraded.

SUMMARY OF THE INVENTION

A main object of the present invention is to provide a fuel cell vehicle having a simple and economical structure and a method of controlling the fuel cell vehicle in which the loss in a DC-DC converter is reduced, and it is possible to improve fuel economy.

The present invention relates to a fuel cell vehicle including a fuel cell capable of generating electrical energy by electrochemical reaction of a reactant gas and outputting the electrical energy to a rotating load, a rechargeable energy storage, a switching mechanism for electrically connecting the fuel cell to the rotating load and the energy storage or electrically disconnecting the fuel cell from the rotating load and the energy storage, and a DC-DC converter connected to the energy storage. Further, the present invention relates to a method of controlling the fuel cell vehicle.

If it is determined that regeneration by the energy storage is performed, the DC-DC converter is placed in a direct connection mode for directly charging regeneration electrical energy from the rotating load to the energy storage.

It is preferable that step-down voltage control of the DC-DC converter is performed before the DC-DC converter is placed in the direct connection mode.

Further, it is preferable that, if it is determined that regeneration is performed, the switching mechanism disconnects the fuel cell from the energy storage. Further, it is preferable that the fuel cell current is controlled to a reference value or less before the switching mechanism electrically disconnects the fuel cell from the energy storage.

Further, it is preferable that step-up voltage control of the DC-DC converter is performed after regeneration by the energy storage is finished, and then, the switching mechanism allows the electrical energy from the fuel cell to be outputted to the rotating load.

In the present invention, when regeneration by the energy storage is performed, the DC-DC converter connected to the energy storage is in the direct connection mode. Therefore, no voltage adjustment (switching) by the DC-DC converter is required. Thus, it is possible to effectively reduce the switching loss in the DC-DC converter. With the simple and economical structure, regeneration energy is collected effectively to ensure improvement in fuel economy.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
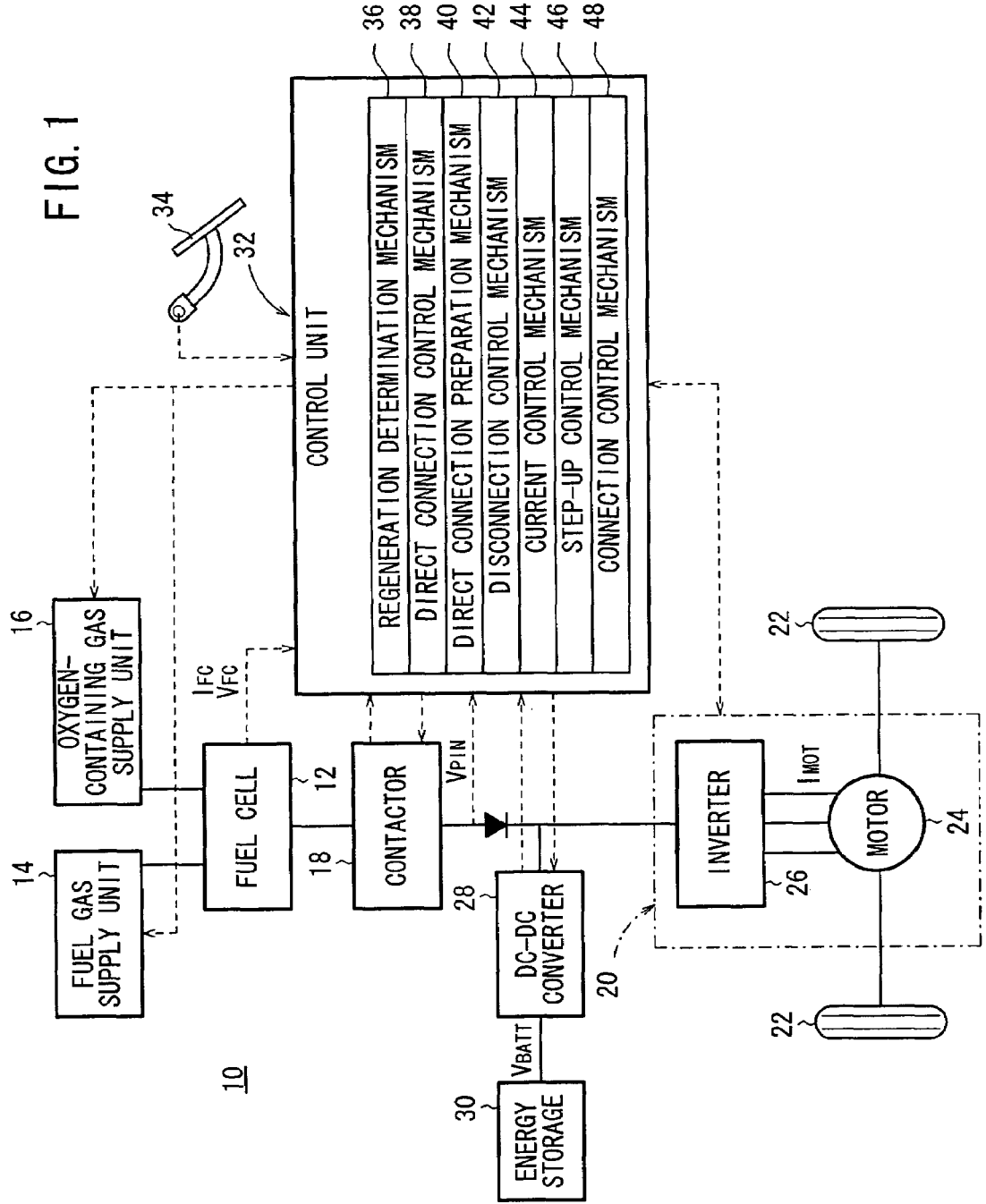
FIG. 1 is a diagram schematically showing the structure of a fuel cell vehicle for carrying out a control method according to a first embodiment of the present invention.

FIG. 1 is a diagram schematically showing structure of a fuel cell vehicle 10 for carrying out a control method according to a first embodiment of the present invention.

The fuel cell vehicle 10 includes a fuel cell 12. A fuel gas supply unit 14 and an oxygen-containing gas supply unit 16 are connected to the fuel cell 12. Further, a coolant supply unit (not shown) is connected to the fuel cell 12 as necessary. Though not shown, the fuel cell 12 comprises a stack of power generation cells each including a membrane electrode assembly and a pair of separators sandwiching the membrane electrode assembly. The membrane electrode assembly includes an anode, and a cathode, and a solid polymer electrolyte membrane interposed between the anode and the cathode.

The fuel gas supply unit 14 supplies a fuel gas such as a hydrogen-containing gas to the anode of the fuel cell 12, and the oxygen-containing gas supply unit 16 supplies an oxygen-containing gas such as air to the cathode of the fuel cell 12.

The fuel cell 12 is connectable to a rotating load 20 through a switching mechanism such as a contactor 18. The rotating load 20 includes a motor 24 and an inverter 26 for transmitting a driving force to both wheels 22. The inverter 26 converts the direct current (DC) electrical energy outputted from the fuel cell 12 and a energy storage 30 as described later into three-phase alternating current (AC) electrical energy, and supplies the electrical energy to the motor 24.

The energy storage 30 is connected between the contactor 18 and the inverter 26 through a DC-DC converter 28. For example, a battery or a capacitor is used as the energy storage 30. The fuel cell vehicle 10 is driven under the control of a control unit 32. Acceleration signals are inputted from an accelerator pedal 34 into the control unit 32.

The control unit 32 has various functions including the functions of a regeneration determination mechanism 36 and a direct connection control mechanism 38. The regeneration determination mechanism 36 determines whether regeneration by the energy storage 30 is performed or not. When it is determined that the regeneration is performed, the direct connection control mechanism 38 places the DC-DC converter 28 in a direct connection mode where the input voltage and the output voltage are the same without voltage adjustment for directly charging the regeneration electrical energy from the motor 24 in the energy storage 30.

Further, the control unit 32 has the functions of a direct connection preparation mechanism 40, a disconnection control mechanism 42, a current control mechanism 44, a step-up voltage control mechanism 46, and a connection control mechanism 48. The direct connection preparation mechanism 40 performs step-down voltage control of the DC-DC converter 28 before the DC-DC converter 28 is placed in the direct connection mode. If it is determined that regeneration is performed, the disconnection control mechanism 42 electrically disconnects the fuel cell 12 from the energy storage 30 by the contactor 18. The current control mechanism 44 controls the fuel cell current to a reference value or less before electrically disconnecting the fuel cell 12 from the energy storage 30 by the contactor 18. When regeneration by the energy storage 30 is finished, the step-up voltage control mechanism 46 performs step-up voltage control of the DC-DC converter 28. The connection control mechanism 48 allows the electrical energy from the fuel cell 12 to be outputted to the motor 24 by the contactor 18.

Figure 2:
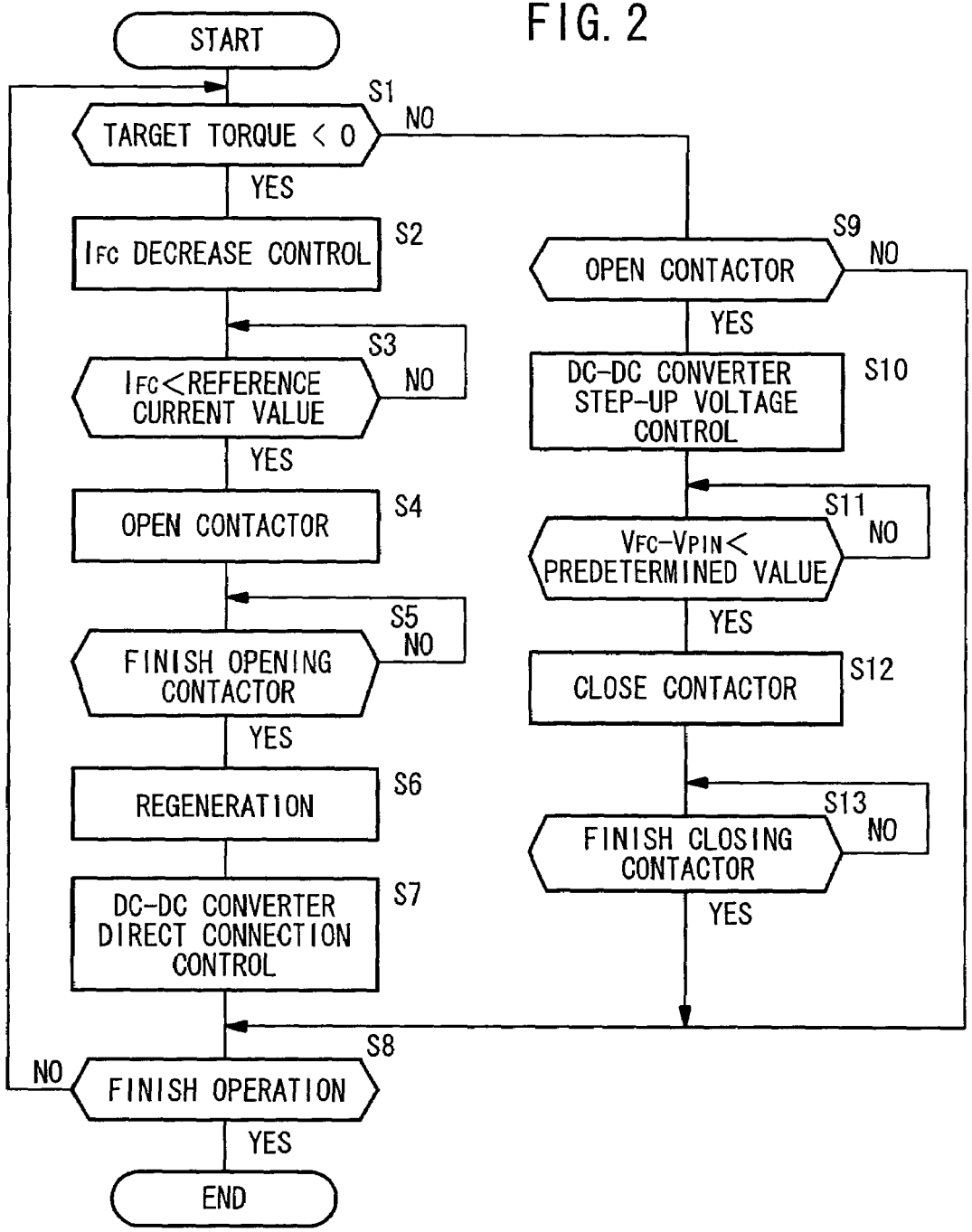
FIG. 2 is a flowchart showing the control method.

Next, a method of controlling the fuel cell vehicle 10 will be described with reference to a flowchart shown in FIG. 2 and timing charts shown in FIGS. 3 to 6.

Figure 3:
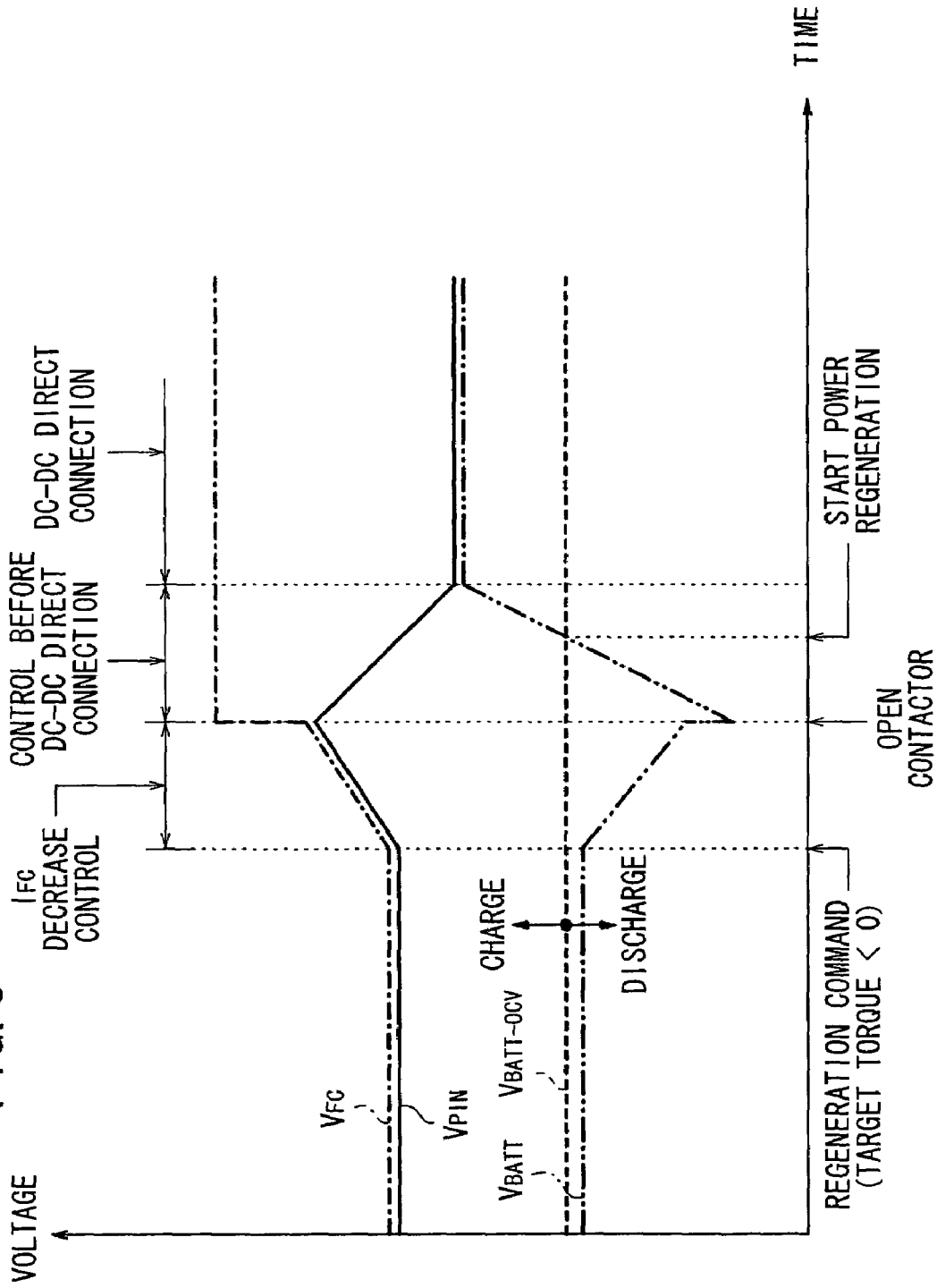
FIG. 3 is a timing chart showing the change in the voltage at the time of starting regeneration.
Figure 4:
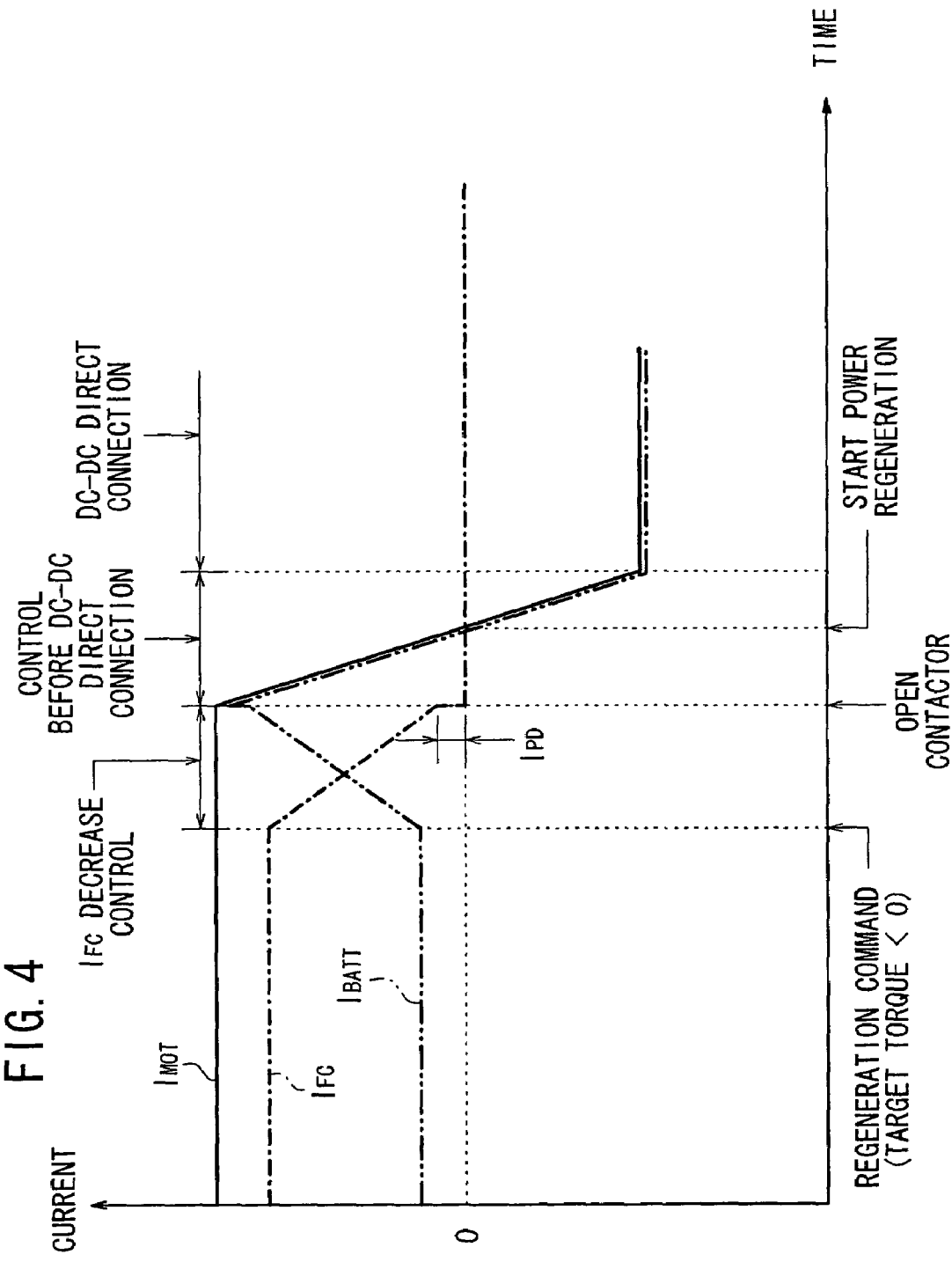
FIG. 4 is a timing chart showing the change in the current at the time of starting regeneration.

In the fuel cell vehicle 10, as shown in FIGS. 3 and 4, during normal running, the fuel cell current IFC from the fuel cell 12 is supplied to the motor 24, and the battery current IBATT from the energy storage 30 is supplied to the motor 24. Therefore, the fuel cell vehicle 10 runs by the motor current IMOT (IFC+IBATT) of the motor 24.

At this time, the contactor 18 is closed such that the voltage difference between the fuel cell voltage VFC of the fuel cell 12 and the inverter voltage VPIN as a voltage command value of the DC-DC converter 28 is maintained at a predetermined value. As shown in FIG. 3, when the voltage of the energy storage 30 is lower than the open circuit voltage (OCV) VBATT-OCV, the electrical energy is discharged from the energy storage 30, and when the voltage of the energy storage 30 is higher than the open circuit voltage VBATT-OCV, the electrical energy is charged in the energy storage 30. That is, switching operation between charging of the energy storage 30 and discharging of the energy storage 30 is performed based on the open circuit voltage VBATT-OCV as a reference.

In the control unit 32, a target torque of the motor 24 is determined in advance. The regeneration determination mechanism 36 determines whether regeneration by the energy storage 30 is performed or not based on whether the target torque is negative or not (step S1). If the regeneration determination mechanism 36 determines that the target torque is negative (YES in step S1), the routine proceeds to step S2, and the current control mechanism 44 performs the control to decrease the fuel cell current IFC.

In the fuel cell 12, as the fuel cell current IFC decreases, the fuel cell voltage VFC increases. Therefore, by the step-up voltage control (switching) of the DC-DC converter 28, the inverter voltage VPIN increases. When the fuel cell voltage IFC decreases, in order to maintain the desired motor current IMOT, in the energy storage 30, the battery current IBATT as the assisting current increases. Thus, the battery voltage VBATT decreases temporarily.

Then, if it is determined that the fuel cell current IFC has a reference current value IPD or less (YES in step S3), the routine proceeds to step S4, and the disconnection control mechanism 42 opens the contactor 18 for electrically disconnecting the fuel cell 12 from the energy storage 30. Thus, the supply of the fuel cell current IFC is stopped. The fuel cell voltage VFC increases, and the battery current IBATT increases temporarily. As the motor current IMOT decreases, the battery current IBATT decreases.

When the opening control of the contactor 18 is finished (YES in step S5), the direct connection preparation mechanism 40 performs the step-down voltage control (switching) of the DC-DC converter 28, and the inverter voltage VPIN decreases. As the battery current IBATT decreases, the battery voltage VBATT increases. After power regeneration is started (step S6), when the inverter voltage VPIN substantially matches the battery voltage VBATT, the direct connection control mechanism 38 places the DC-DC converter 28 in the direct connection mode such that the DC-DC converter 28 is constantly in the ON state (step S7). The voltage of the regeneration electrical energy of the motor 24 is adjusted to the battery voltage VBATT of the energy storage 30 by the inverter 26, and the regeneration electrical energy is charged in the energy storage 30.

After the regeneration process, if operation of the fuel cell vehicle 10 is continued (NO in step S8), the routine goes back to step S1 for determining whether the target torque is negative or not. If it is determined that the target torque is positive, i.e., if it is determined that regeneration is finished (NO in step S1), it is determined whether the contactor 18 is open or not (step S9). If it is determined that the contactor 18 is open (YES in step S9), the step-up voltage control mechanism 46 implements the step-up voltage control of the DC-DC converter 28 (step S10).

Figure 5:
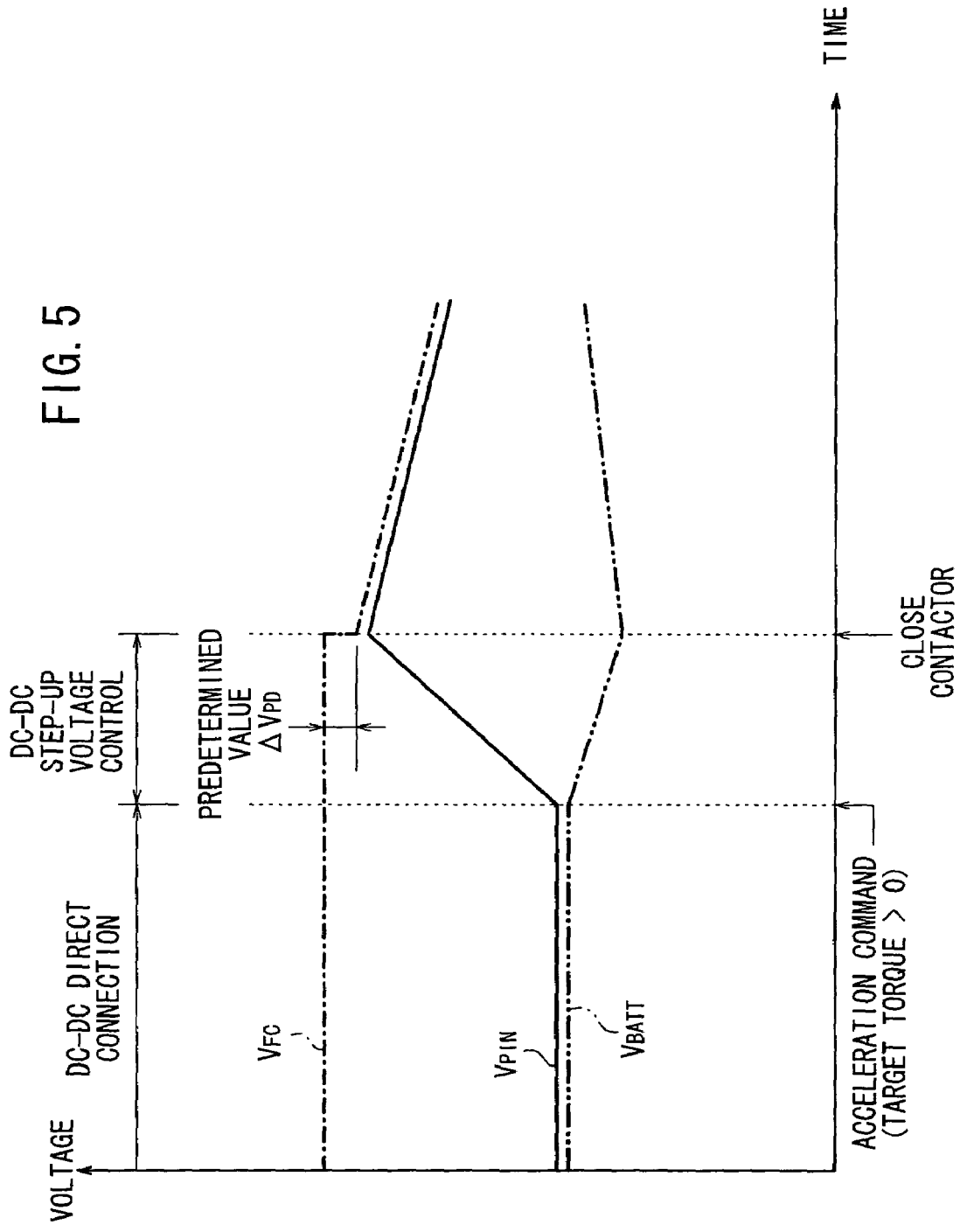
FIG. 5 is a timing chart showing the change in the voltage at the time of returning after regeneration.
Figure 6:
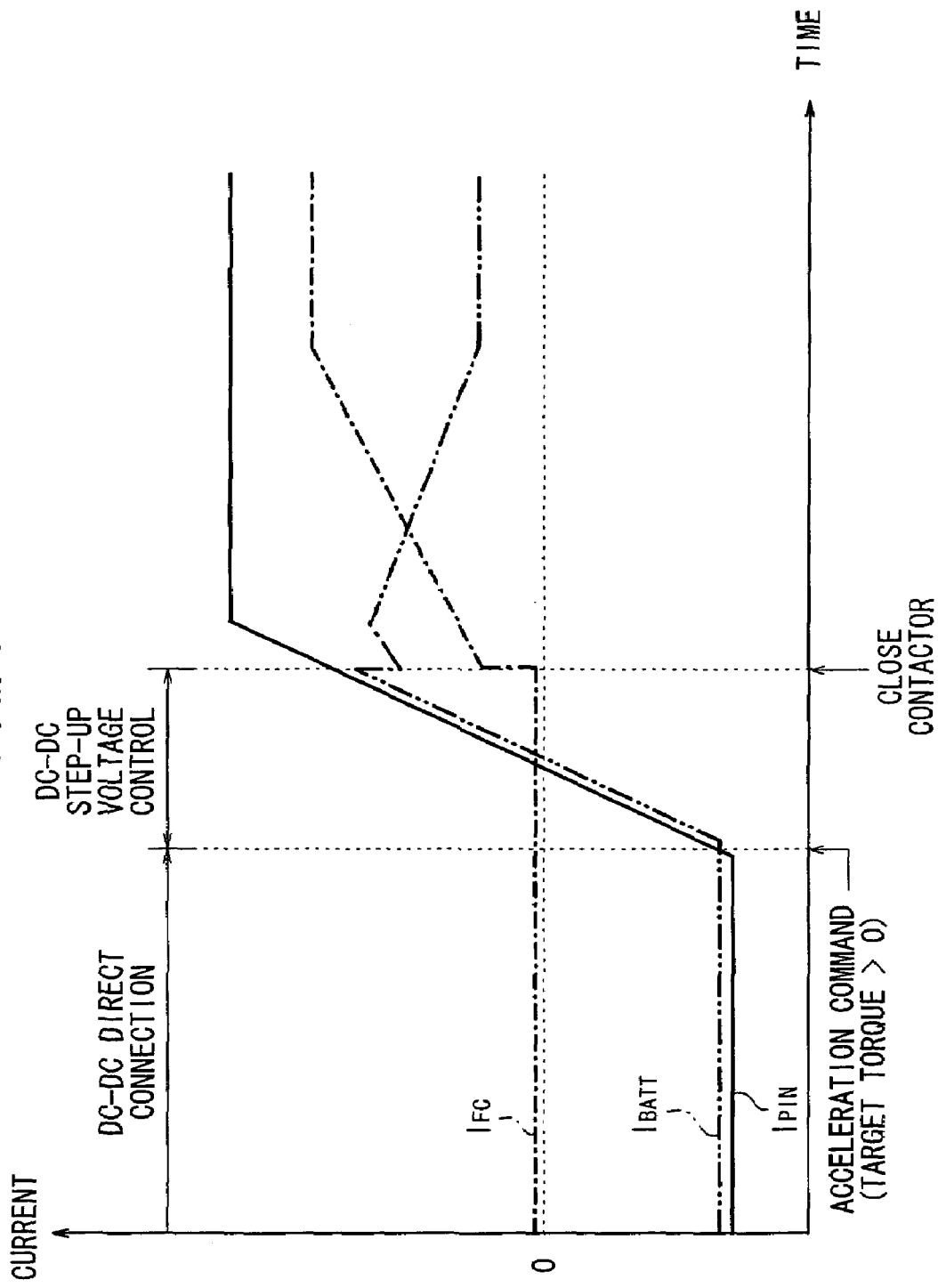
FIG. 6 is a timing chart showing the change in the current at the time of returning after regeneration.

As shown in FIGS. 5 and 6, if the inverter voltage VPIN increases by the step-up voltage control, and the voltage difference between the inverter voltage VPIN and the fuel cell voltage VFC becomes a predetermined value VPD or less (YES in step S11), the routine proceeds to step S12, and the connection control mechanism 48 closes the contactor 18. At this time, due to the raise in the fuel cell current IFC, the battery current IBATT decreases.

Further, when the closing process of the contactor 18 is finished, and the fuel cell 12 is electrically connected to the motor 24 (YES in step S13), the electrically energy can be outputted from the fuel cell 12 to the motor 24.

In the first embodiment, when regeneration electrical energy of the motor 24 is charged in the energy storage 30, the DC-DC converter 28 connected to the energy storage 30 is placed in the direct connection mode. Thus, no voltage adjustment (switching) by the DC-DC converter 28 is required. By the inverter 26 of the motor 24, the voltage of the regeneration electrical energy is adjusted to the voltage of the energy storage 30. Thus, regeneration electrical energy is directly charged in the energy storage 30. Therefore, at the time of regeneration, switching loss due to the voltage adjustment by the DC-DC converter 28 at the time of regeneration is reduced effectively.

Thus, in the first embodiment, with the simple and economical structure, it is possible to efficiently collect the regeneration electrical energy, and improvement in fuel economy is achieved.

Further, when the contactor 18 is opened, the step-up voltage control of the inverter voltage VPIN is implemented in advance by the DC-DC converter 28 such that the fuel cell current IFC becomes the reference current value IPD or less (see FIG. 4). When the contactor 18 is opened, it is possible to limit the current flowing through the contactor 18. No excessive load is imposed on the contactor 18. Thus, it is possible to suitably use the contactor 18 for a long period of time.

Further, when charging of regeneration electrical energy in the energy storage 30 is finished, and the operation is switched to the normal operation, the step-up voltage control of the DC-DC converter 28 is implemented such that the voltage difference between the fuel cell voltage VFC and the inverter voltage VPIN become the predetermined value VPD or less (see FIG. 5). Thus, when the contactor 18 is closed, rush current to the contactor 18 is inhibited. Therefore, it is possible to suitably use the contactor 18 for a long period of time.

In the first embodiment, the contactor 18 is used as the switching mechanism. However, the present invention is not limited in this respect. For example, a DC-DC converter or an IGBT (Insulated Gate Bipolar Transistor) may be used as the switching mechanism.

Figure 7:
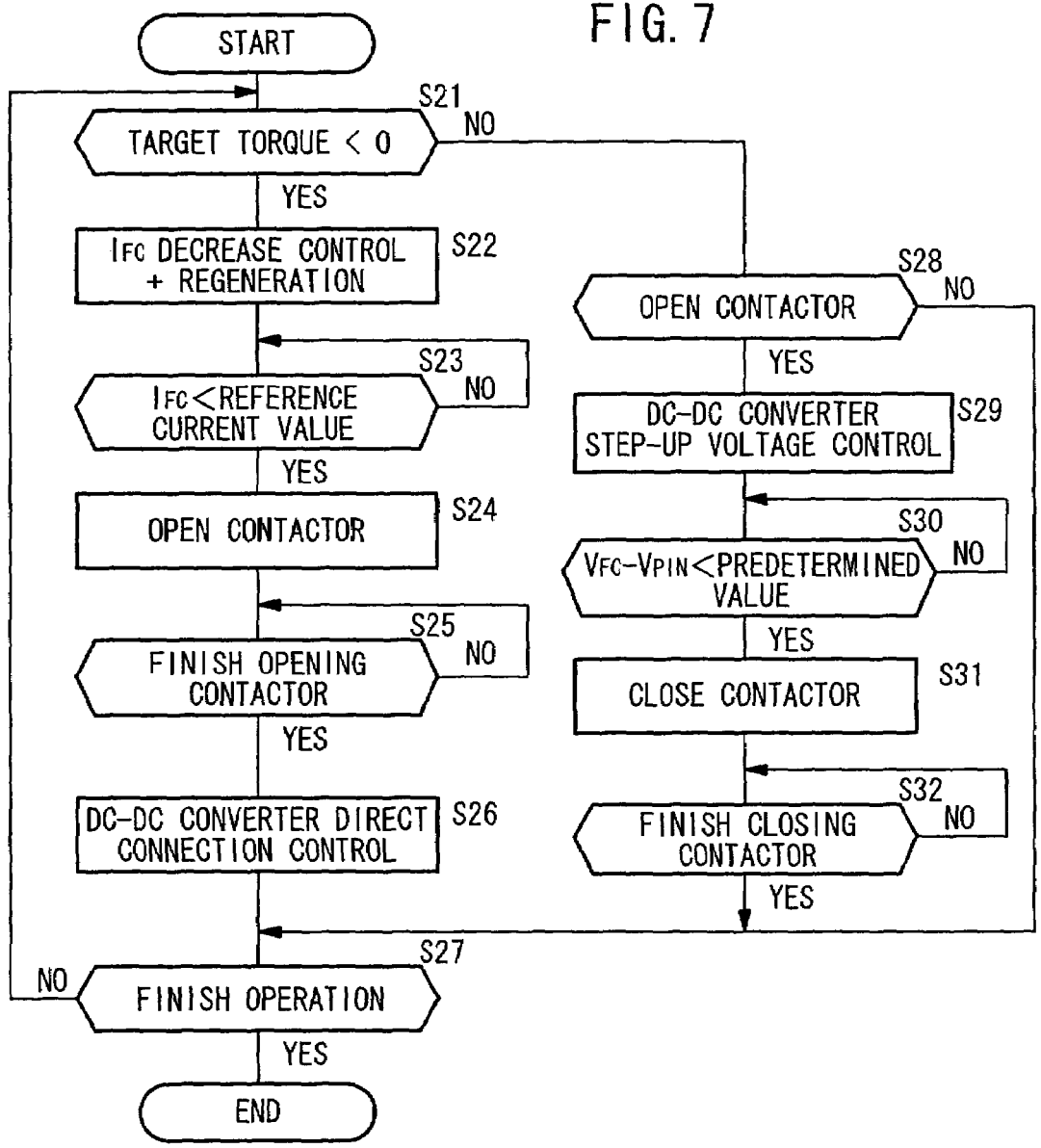
FIG. 7 is a flowchart showing a control method according to a second embodiment of the present invention.
Figure 8:
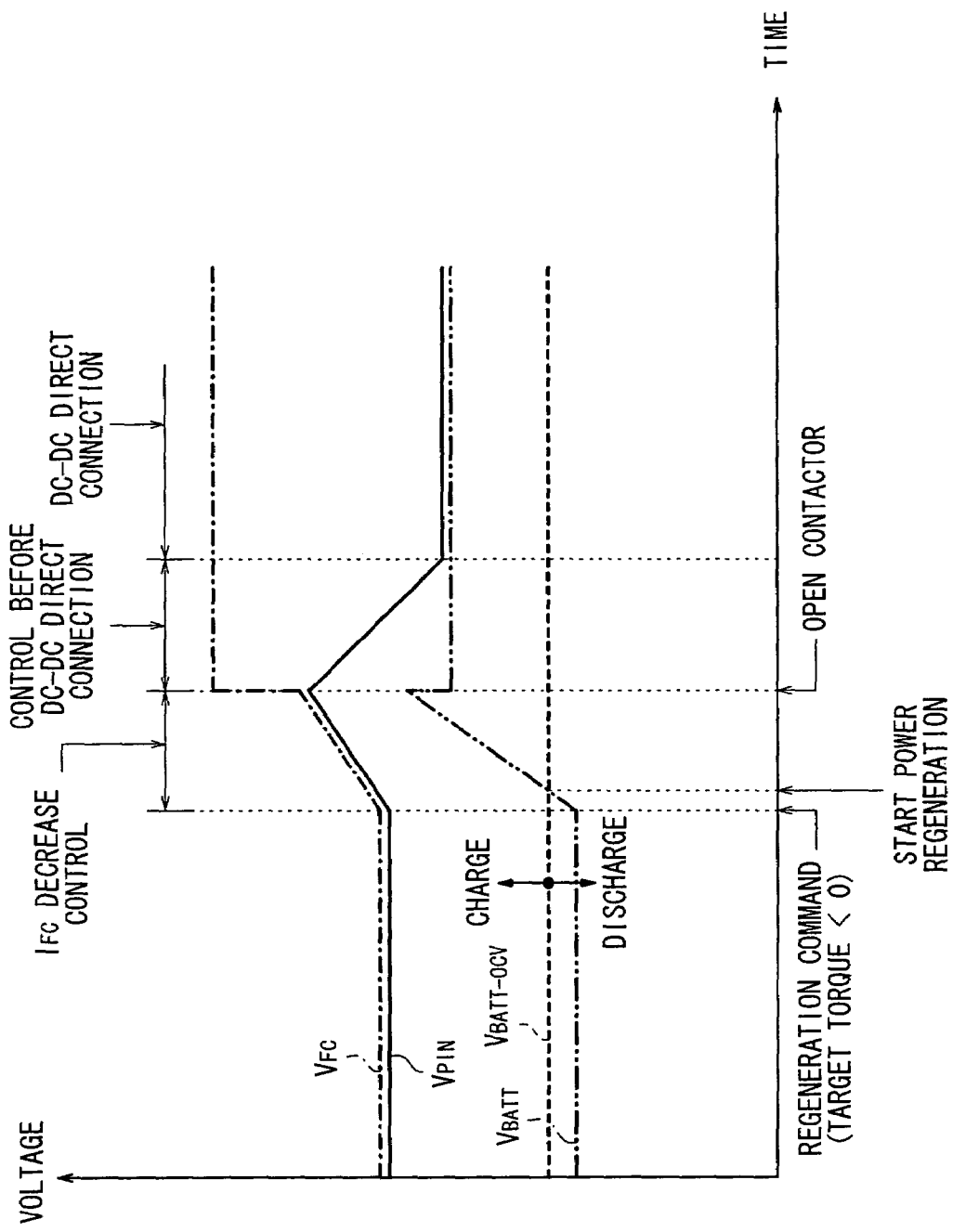
FIG. 8 is a timing chart showing the change in the voltage at the time of starting regeneration.
Figure 9:
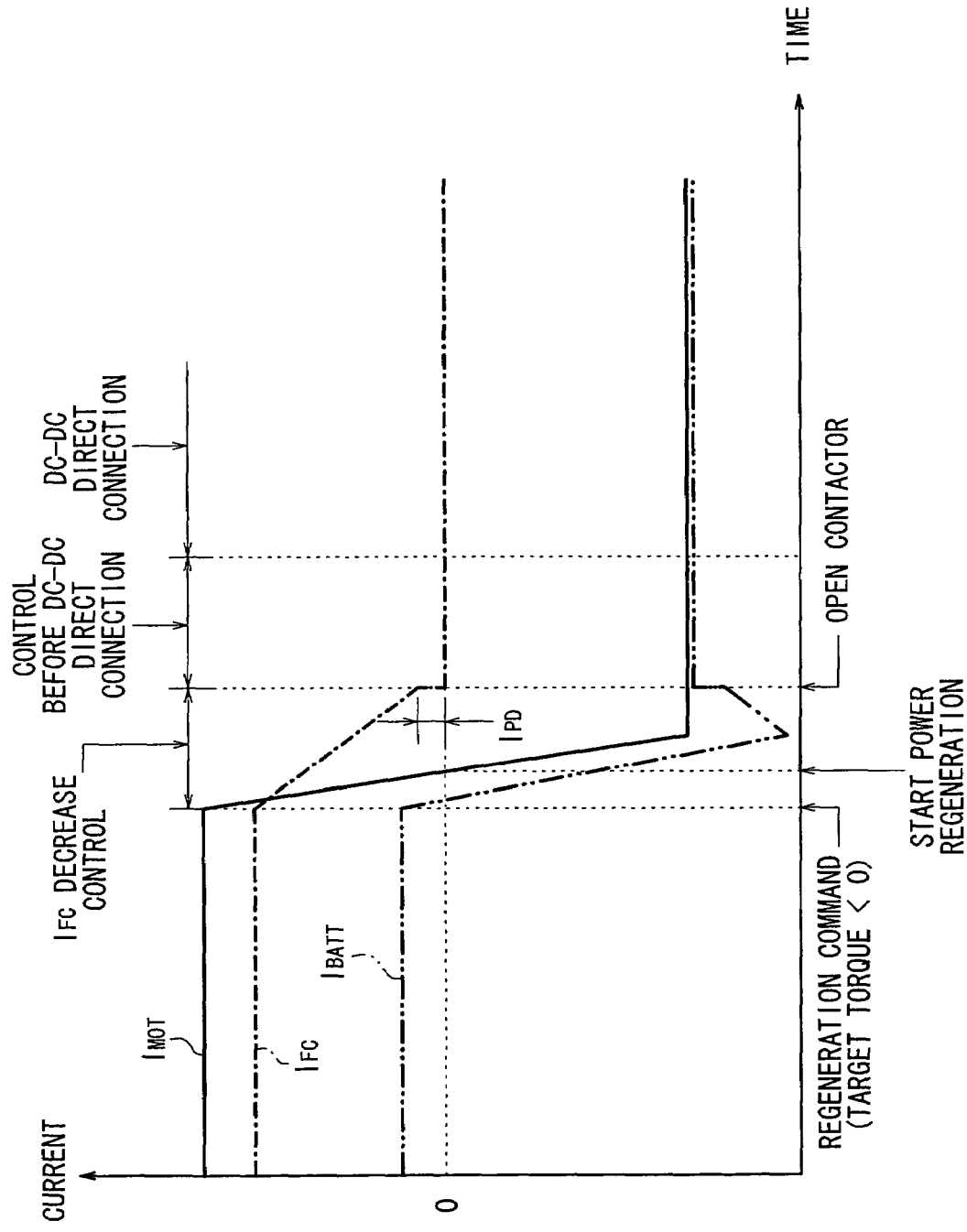
FIG. 9 is a timing chart showing the change in the current at the time of starting regeneration.
Figure 10:
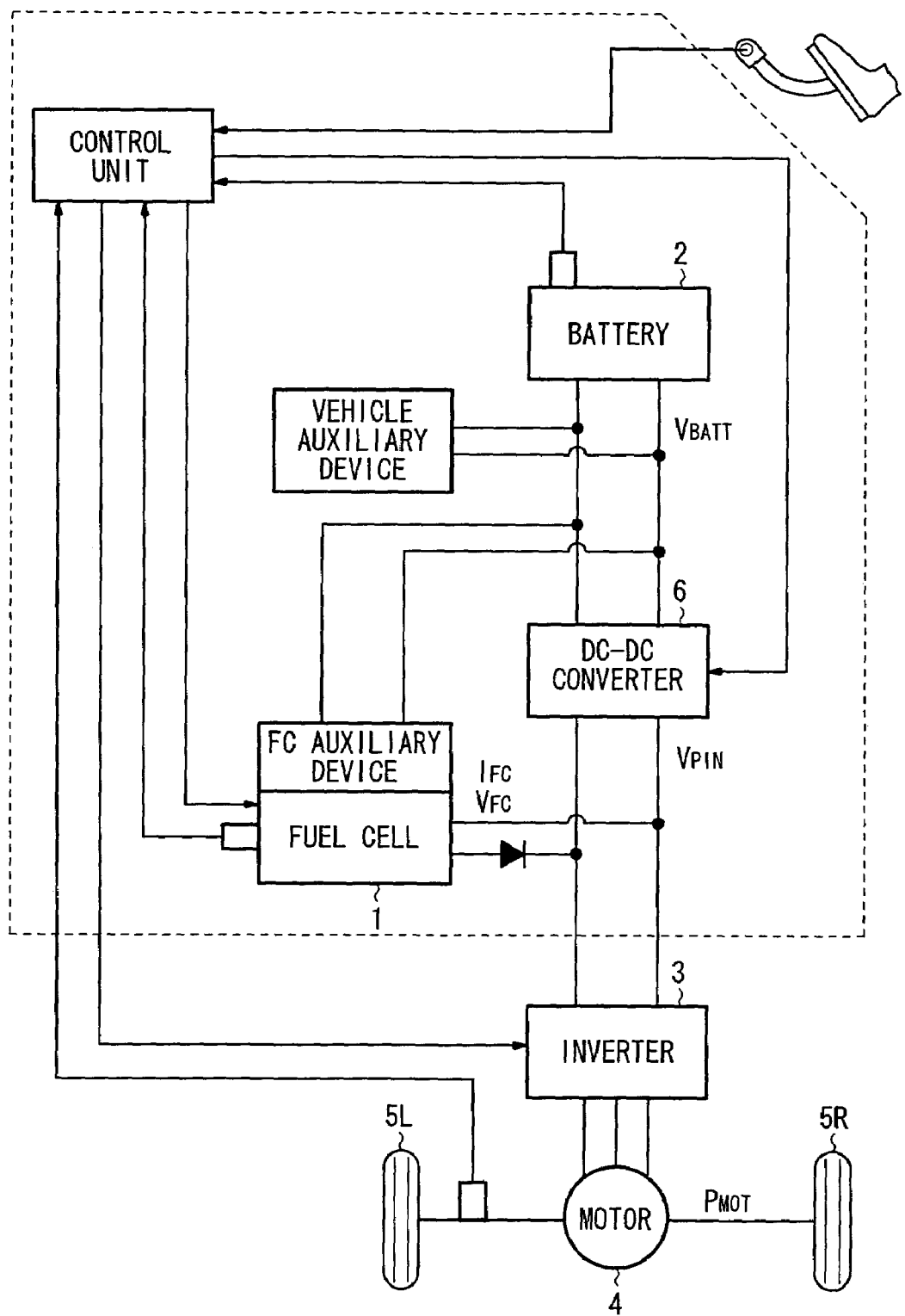
FIG. 10 is a diagram showing a DC power supply including a fuel cell disclosed in Japanese Laid-Open Patent Publication No. 2002-118981.
Figure 11:
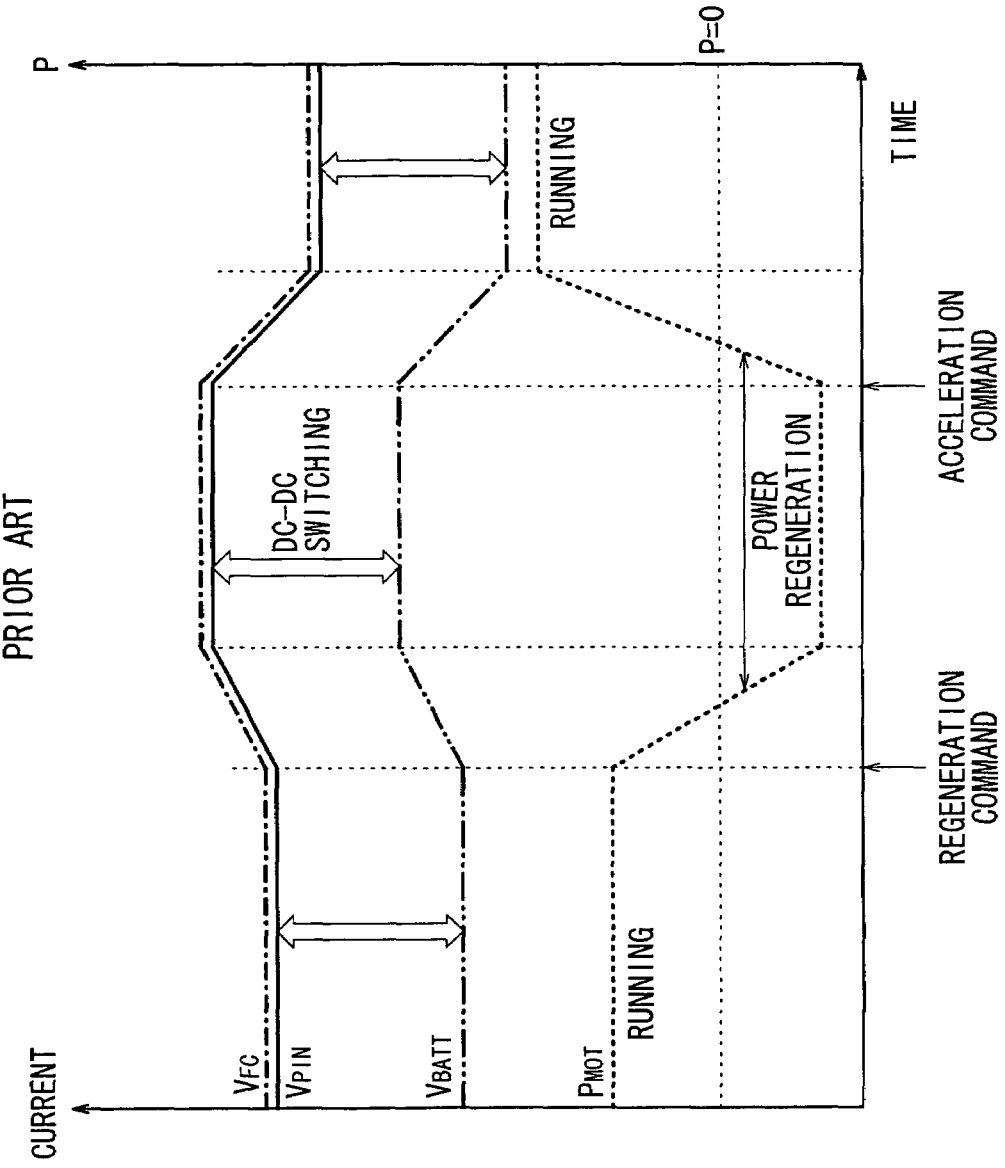
FIG. 11 is a timing chart showing the change in the voltage at the time of starting regeneration in the conventional technique.

FIG. 7 is a flowchart showing a control method according to a second embodiment of the present invention. FIG. 8 is a timing chart showing the change in the voltage at the time of starting regeneration. FIG. 9 is a timing chart showing the change in the current at the time of starting regeneration. The steps that are the same as the steps in the control method according to the first embodiment are not described in detail.

In the second embodiment, if the regeneration determination mechanism 36 determines that the target torque is negative (YES in step S21), the routine proceeds to step S22, and the current control mechanism 44 performs the control to decrease the fuel cell current IFC, and power regeneration is started. Thus, the regeneration electrical energy of the motor 24 is charged in the energy storage 30 by the opening and closing control of the DC-DC converter 28.

Then, if it is determined that the fuel cell current IFC is the reference current value IPD or less (YES in step S23), the routine proceeds to step S24. Thus, after the contactor 18 is opened under control, the direct connection control mechanism 38 is placed in the direct connection mode such that the DC-DC converter 28 is constantly in the ON state (step S26).

In the second embodiment, while the DC-DC converter 28 is in the direct connection mode, it is possible to charge the regeneration electrical energy of the motor 24 in the energy storage 30. Thus, the same advantages as in the case of the first embodiment can be obtained.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A method of controlling a fuel cell vehicle comprising a fuel cell, which generates electrical energy by electrochemical reaction of a reactant gas and outputs the electrical energy to a rotating load, a rechargeable energy storage, a switching mechanism, which electrically connects said fuel cell to said rotating load and said energy storage, or electrically disconnects said fuel cell from said rotating load and said energy storage, a DC-DC converter connected to said energy storage, and a control unit which measures an input voltage and an output voltage of the DC-DC converter, said method comprising the steps of:

determining whether regeneration by said energy storage is performed or not; and during entire period of regeneration by said energy storage, placing said DC-DC converter in a direct connection mode wherein the DC-DC converter does not adjust voltage and the rotating load and the energy storage are directly connected electrically to each other, for directly charging regeneration electrical energy from said rotating load to said energy storage without voltage adjustment by the DC-DC converter.

2. A method according to claim 1, further comprising the step of performing by the control unit step-down voltage control of said DC-DC converter before said DC-DC converter is placed in the direct connection mode.

3. A method according to claim 1, further comprising the step of electrically disconnecting said fuel cell from said energy storage by said switching mechanism if it is determined that the regeneration is performed.

4. A method according to claim 3, further comprising the step of controlling by the control unit the fuel cell current to a reference value or less before electrically disconnecting said fuel cell from said energy storage by said switching mechanism.

5. A method according to claim 1, further comprising the steps of performing by the control unit step-up voltage control of said DC-DC converter after regeneration by the energy storage is finished, and allowing electrical energy from said fuel cell to be outputted to said rotating load by said switching mechanism.

* * * * *